United States Patent [19]

Matsumoto

[11] Patent Number: 4,982,775
[45] Date of Patent: Jan. 8, 1991

[54] PNEUMATIC TIRES HAVING REDUCED NEGATIVE RATIO VARIATION

[75] Inventor: Kenji Matsumoto, Tokyo, Japan

[73] Assignee: Bridgestone Corporation, Tokyo, Japan

[21] Appl. No.: 284,645

[22] Filed: Dec. 15, 1988

[30] Foreign Application Priority Data

Dec. 18, 1987 [JP] Japan ............................ 62-320590

[51] Int. Cl.$^5$ ............................................. B60C 11/11
[52] U.S. Cl. ............................. 152/209 B; 152/209 R
[58] Field of Search ............ 152/209 B, 209 R, 209 A, 152/209 D

[56] References Cited

U.S. PATENT DOCUMENTS 4,289,183  9/1981  Abe et al. ........................ 152/209 B
4,480,672  11/1984  Marshall et al. .................. 152/209 B

FOREIGN PATENT DOCUMENTS 1063458  5/1954  France .......................... 152/209 B
22703    1/1988  Japan ........................... 152/209 B Primary Examiner—Michael W. Ball
Assistant Examiner—Geoffrey L. Knable
Attorney, Agent, or Firm—Sughrue, Mion, Zinn, Macpeak & Seas

[57] ABSTRACT

In a pneumatic tire, when a distance between centers in circumferential direction of adjoining grooves at the center of the tread is a pitch and divided into four equal zones, a ratio of maximum negative ratio to minimum negative ratio among negative ratios of these four divided zones in one pitch is not more than 1.22. Thus, the traction performances and ride comfortability are considerably improved.

4 Claims, 5 Drawing Sheets

FIG_3
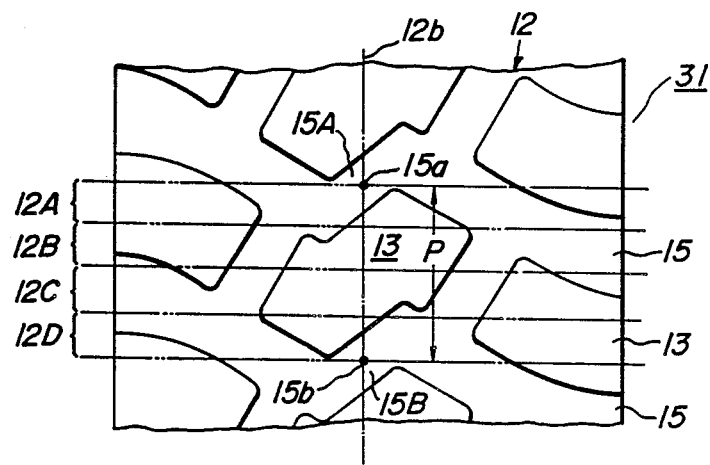
FIG_4
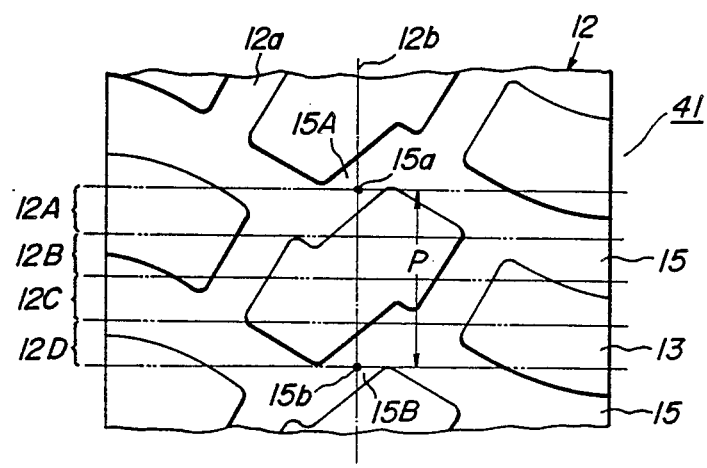

FIG_7
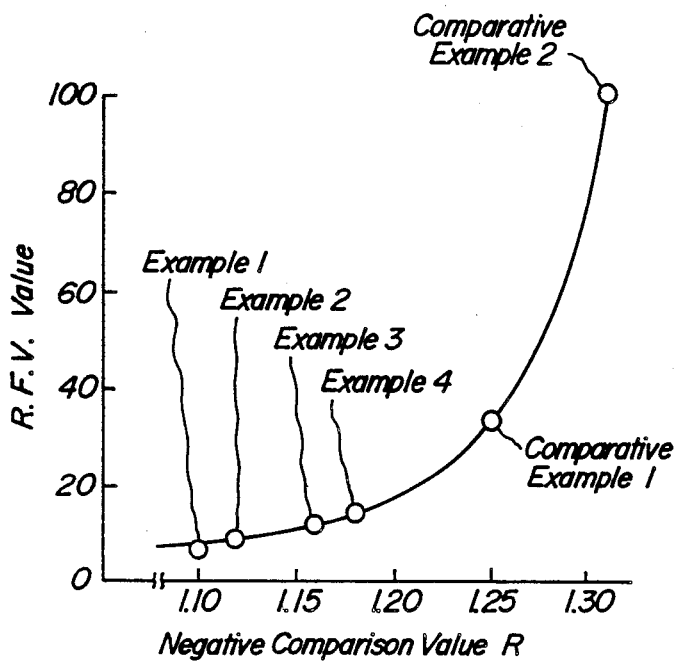
FIG_8
PRIOR ART
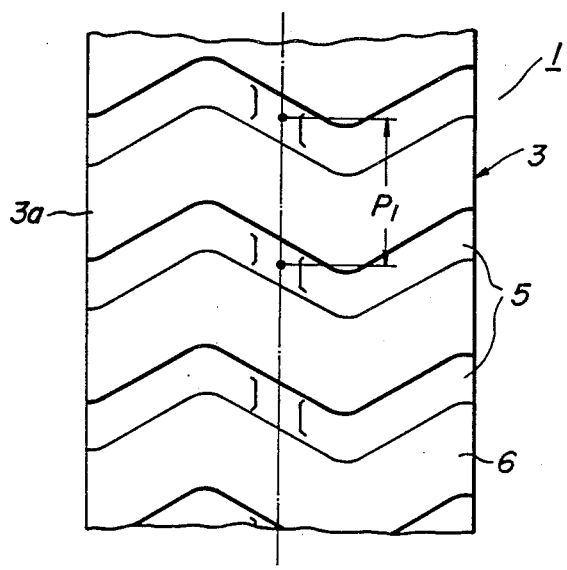

PNEUMATIC TIRES HAVING REDUCED NEGATIVE RATIO VARIATION

BACKGROUND OF THE INVENTION

1. Field of the Invention

This invention relates to pneumatic tires, and more particularly to an improvement in traction performance and ride comfortability of a pneumatic tire being mounted onto, for example, a construction vehicle or the like and running on good and bad roads inclusive of relatively soft road surface, relatively hard road surface, and the like.

2. Related Art Statement

As this type of the tire, there have hitherto been known pneumatic tires as shown in FIGS. 8 to 10. In pneumatic tires 1 and 2 of FIGS. 8 and 9, land portions 6 defined between grooves 5 extending in the widthwise direction of the tire are arranged on a surface portion 3a of a tread 3 at an approximately a constant pitch ($P_1$ or $P_2$) in the circumferential direction of the tire to form an uneven pattern (hereinafter referred to as pattern simply) on the surface portion 3a of the tread 3. These tires 1 and 2 mainly attach importance to the traction performances and in fact have good traction performance. When the tires 1 and 2 are run on a relatively soft road surface under loading, the unevenness of the tread 3 is absorbed by such a road surface, so that vibrations are less during running and there is no problem on ride comfortability. On the other hand, when these tires are run on a relatively hard road surface, vibrations are generated by the unevenness of the tread 3 to cause the problem on ride comfortability. However, such a problem is regarded to be unavoidable because the traction performance is important.

In order to solve this problem, as shown in FIG. 10, the groove is eliminated from the central portion 3b of the tread 3 to form a land portion 6a continuously extending in the circumferential direction. In this case, however, the drastic solution of ride comfortability can not yet be said though the ride comfortability is improved to a certain extent. On the other hand, since the land portion 6a is formed in the central portion 3b, the volume of the groove reduces and the mud brushing performance is degraded to sacrifice the traction performances, so that there is naturally caused a problem of reducing the tractability.

SUMMARY OF THE INVENTION

It is, therefore, an object of the invention to provide a pneumatic tire having satisfactory traction performance and good ride comfortability against vibration when the tire is run on bad and good roads.

The inventors have made various studies with respect to relation between ride comfortability against vibration and uneven pattern of tread, the relation among state of vibration occurrence, frequency analysis and R.F.V. (radial force variation) and the like, and found the following.

That is, the vibration state in the vibrated vehicle was measured by means of an acceleration meter and the frequency thereof was analyzed. As a result, it has been confirmed that the amount of vibration is coincident with frequency generated from pitch component of the tread pattern. Also the occurrence of vibration is caused from a fact that the level of R.F.V. value resulted from the pattern is high.

Now, the inventors have made further studies with respect to the relation between the R.F.V. value and the pattern as a cause for the occurrence of vibration.

As a result, it has been found that the R.F.V. value is largely dependent on the change in the area of the tread directly contacting with ground during the running under loading, i.e. the change of effective ground contact area in the tread. Also the basis of this change is a change of effective ground contact area when the tread pattern is rotated by one pitch.

Further, it has been found that as to the change of area in one pitch, when the full area in one pitch is divided into four equal zones in the circumferential direction of the tire, the ratio of effective ground contact area at each zone is completely interrelated to R.F.V., and can be represented by a ratio of groove area to full area at each zone, i.e. a groove area ratio or so-called negative ratio M. Moreover, it has been found out that maximum negative ratio Mmax and minimum negative ratio Mmin among negative ratios M at each zone in one pitch are necessary to be not more than a given value. Thus, the inventors have made further examinations with respect to the above and the invention has been accomplished.

According to the invention, there is the provision of a pneumatic tire comprising a tread and grooves continuously extending on a surface portion of the tread in the widthwise direction of the tire and dividing the tread into many land portions in the circumferential direction of the tire, characterized in that when a distance between centers in circumferential direction of adjoining grooves at the center of the tread is a pitch and divided into four equal zones, a ratio of maximum negative ratio to minimum negative ratio (hereinafter referred to as negative comparison ratio R) among negative ratios M at four divided zones of the tread in one pitch is not more than 1.22.

In the preferred embodiment of the invention, the negative comparison ratio R is not more than 1.15. According to the invention, when the negative comparison ratio R exceeds 1.22, the R.F.V. value rapidly increases and the ride comfortability against vibration in the running degrades.

BRIEF DESCRIPTION OF THE DRAWINGS

The invention will be described with reference to the accompanying drawings, wherein:

FIGS. 1 to 4 are partial plan views of first to fourth embodiments of the pneumatic tire according to the invention, respectively;

FIG. 7 is a graph showing the effect of the invention; and

FIGS. 8 to 10 are partial plan views of the conventional tires, respectively.

DESCRIPTION OF THE PREFERRED EMBODIMENTS

In the pneumatic tire according to the invention, the grooves extending in the widthwise direction of the tire are formed on the surface portion of the tread, so that satisfactory traction performances are developed on relatively soft road. Further, the negative comparison ratio R as a ratio of maximum negative ratio to minimum negative ratio among negative ratios M at four equal divided zones of one pitch being a distance between centers in circumferential direction of adjoining grooves is not more than a given value, so that the change of effective ground contact area during running under loading is small and the R.F.V. value is small. Therefore, the force of vibrating the tire during running on a relatively hard road surface is small and the occurrence of the vibrations is largely restrained.

Figure 1:
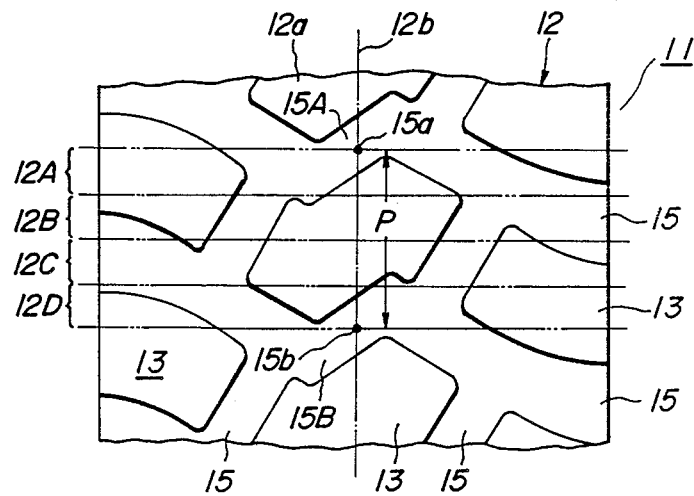

In FIG. 1 is shown a first embodiment of the pneumatic tire according to the invention, wherein numeral 11 is a pneumatic tire having a tire size of 17.5 R25 and used for construction vehicle running on bad and good roads.

The pneumatic tire 11 comprises a tread 12 and grooves 15 continuously extending on a surface portion 12a of the tread 12 in the widthwise direction of the tire and dividing the tread 12 into many land portions 13 in the circumferential direction. The grooves 15 are arranged at a given pitch in the circumferential direction, wherein a distance of one pitch P between centers 15a and 15b in the circumferential direction of adjoining grooves 15A and 15B (hereinafter typically called as groove 15) is 12.7 cm. At the distance between the centers 15a and 15b of the grooves 15, the tread 12 is divided into four equal zones 12A~12D. A land portion 13 in each of these zones comes into contact with ground, in which an area obtained by subtracting the area of the groove from the full area of these zones forms an effective ground contact area. As a ratio of area of groove 15 to full area of each zone 12A~12D, i.e. negative ratio M represented by percentage, the zone 12A is 51.6% and the zone 12B is 46.9%. Since the pattern of the tread 12 is a point symmetry, the negative ratio M of the zone 12C is the same as in the zone 12B and is 46.9%, while the negative ratio M of the zone 12D is the same as in the zone 12A and is 51.6%. Therefore, the negative comparison ratio R of maximum negative ratio to minimum negative ratio is 51.6/46.9=1.10, which is within a range of not more than 1.22 defined in the invention. That is, the change of negative ratio M in one pitch of the tread 12 is small. Consequently, the change of effective ground contact area during the running under loading is small and the level of R.F.V. value is largely lowered to considerably suppress the occurrence of vibration during running. The construction other than the above is the same as in an ordinary pneumatic radial tire.

Then, the effect of the invention will be described with respect to the following test using six kinds of tires, i.e. four tires of Examples 1 to 4 and two tires of Comparative Examples 1 and 2 as the conventional tire.

Figure 2:
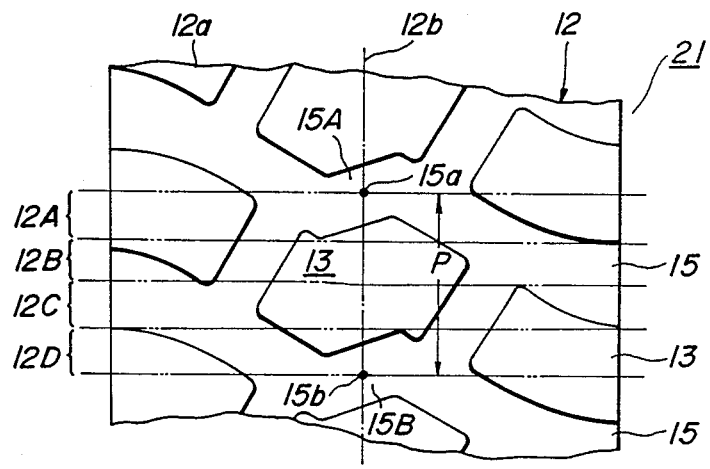

The tire of Example 1 is the same tire as shown in FIG. 1, and the tires of Examples 2 to 4 are tires 21, 31 and 41 as shown in FIGS. 2 to 4, respectively, which have a percentage of negative ratio M (%) and negative comparison ratio R (maximum negative ratio/minimum negative ratio) as shown in the following Table 1. The other construction of these tires is the same as in Example 1.

Figure 5:
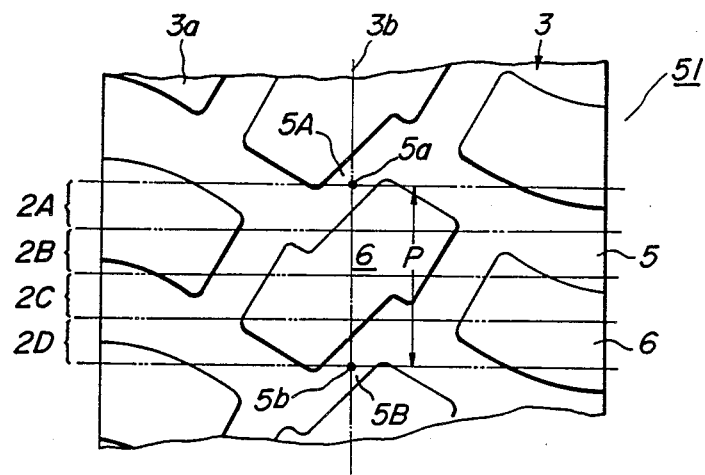
FIGS. 5 and 6 are partial plan views of test tires used as Comparative Examples 1 and 2, respectively.
Figure 6:
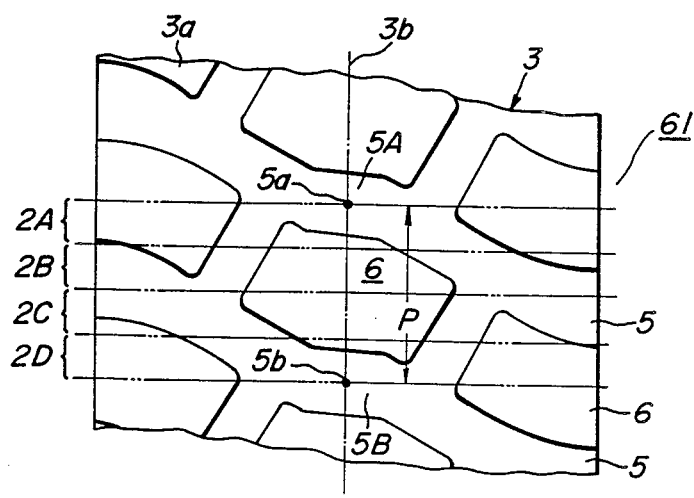
Figure 9:
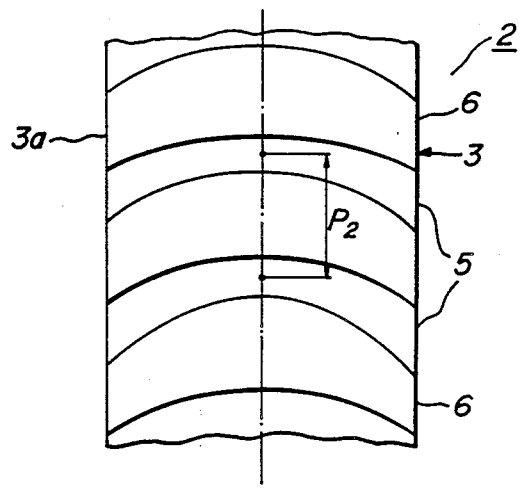
Figure 10:
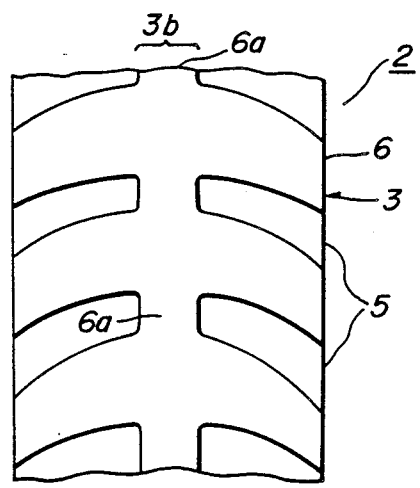

The tires of Comparative Examples 1 and 2 are tires 51 and 61 as shown in FIGS. 5 and 6, respectively, wherein the same parts as in the conventional tires of FIGS. 8 and 9 are represented by the same numeral. In the tires 51 and 61, one pitch P between centers 5a and 5b of adjoining grooves 5A and 5B at the center 3b of the tread 3 is divided into four equal zones 2A~2D, and the negative ratio M at each of these zones 2A~2D and the negative comparison ratio were measured in the same manner as in Example 1 to obtain results as shown in Table 1.

TABLE 1

| Test tire | Example 1 | Example 2 | Example 3 | Example 4 | Comparative Example 1 | Comparative Example 2 |
|---|---|---|---|---|---|---|
| Negative ratio M (%) | | | | | | |
| zone 12A or 2A | 51.6 | 47.3 | 53.9 | 52.8 | 55.0 | 43.0 |
| zone 12B or 2B | 46.9 | 53.3 | 46.3 | 44.8 | 44.0 | 56.2 |
| zone 12C or 2A | 46.9 | 53.3 | 46.3 | 44.8 | 44.0 | 56.2 |
| zone 12D or 2D | 51.6 | 47.3 | 53.9 | 52.8 | 55.0 | 43.0 |
| Negative comparison ratio R | 1.10 | 1.12 | 1.16 | 1.18 | 1.25 | 1.31 |
| R.F.V. value (index) | 6.5 | 8.9 | 11.9 | 14.2 | 33.6 | 100 |

The R.F.V. value as a cause for occurrence of vibration was measured with respect to each of these tires. In this case, the test tire was run on an indoor large drum tester while pushing onto the drum surface through a load cell under loading. The test tire was run at a predetermined speed under a normal internal pressure and a normal load, during which a change of reaction force from the drum was measured by the load cell. The measured results are converted into an index on the basis that the tire of Comparative Example 2 is and shown in FIG. 7 and Table 1.

As shown in FIG. 7, the R.F.V. value rapidly increases when the negative comparison ratio R exceeds 1.22, while when R is not more than 1.15, the R.F.V. value is stable and very small. As seen from these results, the R.F.V. value in the tires of Examples 1 to 4 largely reduces as compared with the conventional tire of Comparative Example 2. Moreover, when the tire of each of Examples 1 to 4 is actually mounted onto a construction vehicle and run on a relatively hard road surface, the occurrence of vibration is considerably reduced and the ride comfortability is largely improved. On the other hand, the traction performances are sufficient when being run on a relatively soft road surface.

As mentioned above, according to the invention, when the tire is mounted on a construction vehicle or the like and run on both bad and good roads, the ride comfortability against vibrations can be largely improved with sufficient traction performances.

What is claimed is:

1. A pneumatic tire comprising; a tread divided into land portions in the circumferential and widthwise directions of the tire by first grooves continuously extending in the widthwise direction of the tire and second grooves circumferentially disposed at both sides with respect to the equator of the tire and connecting adjoining first grooves to each other, wherein when a distance between centers in the circumferential direction of the adjoining first grooves at the center of the tread is a pitch and divided into four equal zones, a negative comparison ratio (R) of a maximum negative ratio to a minimum negative ratio among negative ratio M at four divided zones of the tread in one pitch is not more than 1.22.

2. The pneumatic tire according to claim 1, wherein said negative comparison ratio R is not less than 1.1 but not more than 1.15.

3. The pneumatic tire according to claim 1, wherein said negative ratio M is within a range of 44.8 to 53.9.

4. The pneumatic tire according to claim 1, wherein said land portions comprise a series of circumferentially arranged blocks on said tire equator.